(12) United States Patent
Bao et al.

(10) Patent No.: US 10,233,349 B2
(45) Date of Patent: Mar. 19, 2019

(54) ACRYLIC AQUEOUS DISPERSIONS FOR CONTAINER COATINGS

(71) Applicant: PPG Industries Ohio, Inc., Cleveland, OH (US)

(72) Inventors: Hanzhen Bao, Mason, OH (US); Youssef Moussa, Loveland, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1121 days.

(21) Appl. No.: 14/171,799

(22) Filed: Feb. 4, 2014

(65) Prior Publication Data

US 2015/0218407 A1   Aug. 6, 2015

(51) Int. Cl.
| | |
|---|---|
| *C09D 133/14* | (2006.01) |
| *B65D 23/02* | (2006.01) |
| *C08F 251/02* | (2006.01) |
| *C08F 265/04* | (2006.01) |
| *C09D 151/00* | (2006.01) |
| *C09D 125/14* | (2006.01) |

(52) U.S. Cl.
CPC .......... *C09D 133/14* (2013.01); *B65D 23/02* (2013.01); *C08F 251/02* (2013.01); *C08F 265/04* (2013.01); *C09D 125/14* (2013.01); *C09D 151/003* (2013.01); *Y10T 428/1393* (2015.01)

(58) Field of Classification Search
CPC ............. C09D 133/14; C09D 125/14; C09D 151/003; C08F 265/04; C08F 251/02; B65D 23/02; Y10T 428/1393
See application file for complete search history.

(56) References Cited

U.S. PATENT DOCUMENTS

| | | | |
|---|---|---|---|
| 3,644,584 | A | 2/1972 | du Pont et al. |
| 3,676,526 | A | 7/1972 | Sommerfield |
| 4,052,525 | A | 10/1977 | Ide et al. |
| 5,286,801 | A | 2/1994 | Besecke et al. |
| 6,013,324 | A | 1/2000 | Frangou et al. |
| 6,646,041 | B2 | 11/2003 | St. John Williams et al. |
| 7,189,787 | B2 | 3/2007 | O'Brien et al. |
| 2011/0288232 | A1* | 11/2011 | Rademacher .......... C08F 6/006 524/745 |
| 2012/0302690 | A1 | 11/2012 | Cunningham et al. |

FOREIGN PATENT DOCUMENTS

| | | |
|---|---|---|
| TW | 352345 | 2/1999 |
| TW | 200745280 | 12/2007 |
| WO | 2012/089747 A1 | 7/2012 |
| WO | WO 2013/092539 A1 | 6/2013 |
| ZA | 9608085 A | 4/1997 |

OTHER PUBLICATIONS

Espacenet English abstract of TW 352345.
Espacenet English abstract of TW 200745280.

* cited by examiner

*Primary Examiner* — James C Yager
(74) *Attorney, Agent, or Firm* — William J. Uhl

(57) ABSTRACT

Acrylic aqueous dispersions useful in coating compositions for coating food and beverage containers are disclosed. The aqueous dispersion is the reaction product of:
 (a) a hydrophobic vinyl addition polymer containing pendant or terminal ethylenically unsaturated groups,
 (b) a mixture of vinyl monomers including a vinyl monomer containing carboxylic acid groups;
the reaction product containing active hydrogen groups and being at least partially neutralized with a base and dispersed in aqueous medium; the aqueous dispersion being substantially free of bisphenol A and derivatives thereof.

23 Claims, No Drawings

ACRYLIC AQUEOUS DISPERSIONS FOR CONTAINER COATINGS

FIELD OF THE INVENTION

The present invention relates to aqueous dispersions of graft acrylic polymers comprising a hydrophobic portion and a hydrophilic portion and the use of such dispersions in container coatings.

BACKGROUND OF THE INVENTON

A wide variety of coatings have been used to coat the surfaces of food and beverage containers. For example, metal cans are sometimes coated using coil coating or sheet coating operations, that is, a plane or coil or sheet of a suitable substrate, for example, steel or aluminum, is coated with a suitable composition and cured. The coated substrate is then formed into the can body or can end. Alternatively, the coating composition may be applied, for example, by spraying, dipping and roll coating, to the formed can and then cured. Coatings for food and beverage containers should preferably be capable of high speed application to the substrate and provide the necessary properties when cured to perform in a demanding end use. For example, the coating should be safe for food contact and have excellent adhesion to the substrate.

Many of the coating compositions for food and beverage containers are based on epoxy resins that are the polyglycidyl ethers of bisphenol A. Bisphenol A in packaging coatings either as bisphenol A itself (BPA) or derivatives thereof, such as diglycidyl ethers of bisphenol A (BADGE), epoxy novolak resins and polyols prepared with bisphenol A and bisphenol F are problematic. Although the balance of scientific evidence available to date indicates that small trace amounts of BPA or BADGE that might be released from existing coatings does not pose health risks to humans, these compounds are nevertheless perceived by some as being harmful to human health. Consequently, there is a strong desire to eliminate these compounds from coatings for food and beverage containers. Accordingly, what is desired is a packaging coating composition for food or beverage containers that does not contain extractable quantities of BPA, BADGE or other derivatives of BPA and yet has excellent properties such as excellent adhesion to the substrate.

SUMMARY OF THE INVENTION

The present invention provides an article comprising a body portion or an end portion of a food or beverage can and a coating composition disposed thereon wherein the coating composition comprises an aqueous dispersion that is the reaction product of:
 (a) a hydrophobic vinyl addition polymer containing pendant ethylenically unsaturated groups,
 (b) a mixture of vinyl monomers including a vinyl monomer containing carboxylic acid groups;
the reaction product containing active hydrogen groups and being at least partially neutralized with a base and dispersed in aqueous medium; the aqueous dispersion being substantially free of bisphenol A and derivatives thereof.

The invention further provides a method comprising:
 (a) providing a coating composition comprising the above-mentioned aqueous dispersion,
 (b) applying the coating composition to a metal substrate prior to or after forming the metal substrate into a food or beverage can or portion thereof.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refer to one or more of these components.

When referring to any numerical range of values, such ranges are understood to include each and every number and/or fraction between the stated range minimum and maximum.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids. e.g., $C_1$-$C_2$ substituted acrylic acids, such as methacrylic acid, ethacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

The term "acid" includes acid salts.

The term "food" includes both food and beverages.

The term "hydrophobic vinyl addition polymer" means a polymer that is not self-dispersible with amine in water.

As used herein molecular weights are determined by gel permeation chromatography using a polystyrene standard. Unless otherwise indicated molecular weights are on a number average basis.

The hydrophobic vinyl addition polymer is prepared from a mixture of vinyl monomers including a vinyl monomer that provides pendant or terminal ethylenically unsaturated groups. Examples of such monomers are those containing two or more ethylenically unsaturated groups of different reactivity, for example, (meth)acrylate functionality and (meth)allyl functionality. Examples of such monomers are (meth)allyl (meth)acrylate such as allyl acrylate and allyl methacrylate. Examples of other monomers containing (meth)acrylate unsaturation and less reactive ethylenic unsaturation are macromonomers such as condensates of hydroxyalkyl(meth)acrylates such as hydroxyethyl(meth) acrylate and alpha, beta-ethylenically unsaturated dicarboxylic acids such as maleic acid or anhydride and itaconic acid.

The vinyl monomer providing the pendant or terminal ethylenic unsaturation is present in the mixture of vinyl monomers in (a) in amounts of 5 to 40, such as 10 to 30 percent by weight based on total weight of vinyl monomers in (a).

The other vinyl monomers in the mixture of vinyl monomers of (a) can be vinyl aromatic monomers such as styrene and vinyl toluene, hydroxyalkyl(meth)acrylates containing from 2 to 4 carbon atoms in the hydroxyalkyl group such as hydroxyethyl and hydroxybutyl (meth)acrylate. The hydroxyalkyl(meth)acrylates are typically present in (a) in amounts of 20 to 60, such as 30 to 50 percent by weight based on total weight of the vinyl monomers used in the preparation of (a).

The hydrophobic vinyl addition polymer (a) typically has a number average molecular weight of from 3,000 to 50,000, such as 10,000 to 40,000, and a pendant or terminal ethylenically unsaturated group equivalent weight of 5,000 to 20,000, such as 7,000 to 15,000.

The hydrophobic vinyl addition polymer is present in the aqueous dispersion in amounts of 30 to 80, such as 50 to 70 percent by weight based on total weight of monomers used in the preparation of (a) and (b).

The hydrophobic vinyl addition polymer (a) is prepared using known free radical polymerizing methods carried out in organic solvent. Examples of suitable solvents are alcohols such as n-butanol, isopropanol and glycol monoalkyl ethers such as 2-butoxy ethanol, including mixtures thereof. Examples of free radical initiators include peroxides, peresters and azobiscarbonitriles. Specific examples are t-butyl peroxide, t-butyl peroctoate and 2,2'-azobis(2-methyl isobutyronitrile). Typically, a monomer mixture and initiator are added to the reaction vessel over a period of about 0.5 to 3 hours with a polymerization temperature of 80 to 150°C.

As mentioned above, a mixture of vinyl monomers including a vinyl monomer containing carboxylic add groups is reacted with the hydrophobic vinyl addition polymer. Examples of monomers containing carboxylic acid groups are (meth)acrylic acid, itaconic acid and crotonic acid. These monomers are typically used in amounts of 20 to 60 percent by weight based on total weight of the vinyl monomers present in the mixture of vinyl monomers (b). Other monomers are usually included in the mixture of vinyl monomers of (b). Examples include vinyl aromatic monomers, such as styrene and vinyl toluene, and alkyl esters of (meth)acrylic acid containing from 1 to 12 carbon atoms in the alkyl group. Specific examples include methyl (meth)acrylate, ethyl (meth)acrylate, butyl (meth)acrylate and lauryl (meth)acrylate.

The reaction product of (a) with (b) is typically done by adding the mixture of vinyl monomers (b) with free radical initiator as described above to the hydrophobic vinyl addition polymer dissolved or dispersed in organic solvent such as those mentioned above. The time and temperature of the reaction is generally as described above.

The relative amounts of (a) and (b) are typically within the range of 50 to 80 percent of (a) and 20 to 50 percent of (b), the percentages being by weight based on total weight of (a) and (b).

The reaction product typically has a number average molecular weight of 5,000 to 70,000, such as 15000 to 50,000, and an acid value of 40 to 200, such as 60 to 120. Usually the reaction product contains active hydrogens such as hydroxyl and has a hydroxyl value of 80 to 200, such as 100 to 150. The hydroxyl value and acid value are based on resin solids of the reaction product.

The reaction product is dispersed in aqueous medium, typically by adding the reaction product to water containing a base such as sodium hydroxide or a tertiary amine such as dimethylethanolamine to at least partially neutralize the carboxylic acid groups. The pH of the dispersion is typically from 8 to 10. The dispersion has a resin solids content of from 10 to 50 percent by weight based on total weight of the dispersion.

The aqueous polymer dispersions of the invention are stable liquid systems. They form films, and can therefore be used as binders for pigmented and unpigmented coating compositions that are used to coat containers such as food cans.

Coating compositions for container coatings are typically formulated with a curing agent that is reactive with the functional groups of the film-forming polymer.

Typically curing agents are phenolplasts or phenol-formaldehyde resins and aminoplast or triazine-formaldehyde resins. The phenol-formaldehyde resins are preferably of the resol type. Examples of suitable phenols are phenol itself, butyl phenol, xylenol and cresol. Cresol-formaldehyde resins, typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, typically BAKELITE 6581LB.

Examples of aminoplast resins are those which are formed by reacting a triazine such as melamine or benzoguanamine with formaldehyde. Preferably, these condensates are etherified typically with methanol, ethanol, and butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Typically, the film-forming polymer is used in amounts of 30 to 95, such as 70 to 90 percent by weight, and the crosslinking agent is present in amounts of 5 to 70, such as 10 to 30 percent by weight, the percentages by weight being based on the weight of total resin solids in the coating composition.

The coating composition can contain adjuvant resins such as polyester polyols, polyether polyols and polyurethane polyols to maximize certain properties of the resultant coating. When present, the adjuvant resin is used in amounts of up to 50, typically 2 to 50 percent by weight based on weight of resin solids of the coating composition.

Another optional ingredient that is typically present in the coating composition is a catalyst to increase the rate of cure or crosslinking of the coating compositions. Generally acid catalyst may be used and is typically, present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphonic acid. It has been found that the amount of acid catalyst in the coating compositions of the invention is not as great as would normally be expected due to the presence of the reaction product of the phosphorus acid with the polyglycidyl ether of cyclohexane dimethanol. This reaction product is acidic and has been found to contribute to the cure of the coating composition.

A lubricant that facilitates manufacture of metal containers by imparting lubricity to the sheets of a coated metal substrate used in forming the containers can also be used. Examples of lubricants include carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can be included in the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

The compositions used in the practice of the invention are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds, derivatives or residues thereof.

The coating compositions of the present invention can be applied to containers of all sorts and are particularly well adapted for use on food and beverage cans (e.g., two-piece cans, three-piece cans, etc.). Besides food and beverage containers, the coating compositions can be applied to containers for aerosol applications such as deodorant and hair spray.

Two-piece cans are manufactured by joining a can body (typically a drawn metal body) with a can end (typically a drawn metal end). The coatings of the present invention are suitable for use in food or beverage contact situations and may be used on the inside or outside of such cans. They are suitable for spray applied, liquid coatings, wash coatings, sheet coatings, over varnish coatings and side seam coatings.

Spray coating includes the introduction of the coating composition into the inside or outside of a preformed packaging container. Typical preformed packaging containers suitable for spray coating include food cans, beer and beverage containers, and the like. The sprayed preformed container is then subjected to heat to remove the residual solvents and harden the coating.

A coil coating is described as the coating, typically by a roll coating application, of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing preformed two-piece DM cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife". Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets". Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

EXAMPLES

The following examples are offered to aid in understanding of the present invention and are not to be construed as limiting the scope thereof. Unless otherwise indicated, all parts and percentages are by weight.

Example 1

The following Example shows the preparation of an aqueous dispersion that is prepared from the reaction product of (a) a hydrophobic vinyl addition polymer having pendent ethylenically unsaturated groups; (b) a mixture of vinyl monomers including methacrylic acid. The reaction product was partially neutralized with an amine and dispersed in water.

A three-liter round bottom, four-necked flask equipped with an agitator, a nitrogen inlet tube, a thermometer, and a reflux condenser was charged with 43.67 parts of n-butanol, 143.29 parts of 2-butoxy ethanol, and 100.0 parts of isopropanol. The flask was heated gradually to reflux at around 98° C. Reflux was maintained during the polymerization. In a separate vessel, a monomer/initiator mixture was prepared containing 251.57 parts of styrene, 201.59 parts of hydroxyethyl methacrylate, 6.90 parts of allyl methacrylate, and 16.67 parts of tert-butyl peroctoate. At 98° C., the monomer/initiator mixture was added to the reactor at a steady rate over 2.5 hours. When the monomer/initiator mixture addition was complete, the monomer/initiator mixture vessel was rinsed with 11.67 parts of 2-butoxy ethanol which was added to the flask. The batch was held at 98° C. for 30 minutes. After the hold, a dean stark was installed along with the reflux condenser. Batch temperature was raised to 128° C. and about 91.88 parts of isopropanol was stripped out and collected in the dean stark. During the stripping, in a separate vessel, a monomer/initiator/solvent mixture was prepared comprising 112.38 parts of methacrylic acid, 112.38 parts of n-butyl methacrylate, 25.01 parts of styrene, 6.13 parts of tert-butyl peracetate (50% aqueous solution), 139.05 parts of n-butanol, and 74.90 parts of 2-butoxy ethanol. After isopropanol was stripped out, dean stark was removed and setup was changed back to straight reflux condenser. The monomer/initiator/solvent mixture was then added to the reactor at a steady rate over 2 hours while maintaining temperature at about 128° C. When the monomer/initiator/solvent mixture addition was complete, the monomer/initiator/solvent mixture vessel was rinsed with 7.89 parts of 2-butoxy ethanol which was then added to the reactor. The batch was held at 128° C. for 1 hour. The batch was then cooled. When the batch reached 100° C., 59.76 parts of dimethyl ethanolamine was charged over 5 minutes. Then 1001.15 parts of DI water was charged over 20 minutes. This batch yielded a polymer dispersion with 33.33% NV, a particle size of 0.119±0.026 μm, a viscosity of 15,380 centipoise, and a number average molecular weight of 15,093.

Example 2

The following Example is similar to Example 1 but replacing hydroxyethyl methacrylate with hydroxypropyl methacrylate.

A three-liter round bottom, four-necked flask equipped with an agitator, a nitrogen inlet tube, a thermometer, and a reflux condenser was charged with 43.67 parts of n-butanol, 143.29 parts of 2-butoxy ethanol, and 100.0 parts of isopropanol. The flask was heated gradually to reflux at around 98° C. Reflux was maintained during the polymerization. In a separate vessel, a monomer/initiator mixture was prepared containing 251.57 parts of styrene, 201.59 parts of hydroxypropyl methacrylate, 6.90 parts of allyl methacrylate, and 16.67 parts of tert-butyl peroctoate. At 98° C., the monomer/initiator mixture was added to the reactor at a steady rate over 2.5 hours. When the monomer/initiator mixture addition was complete, the monomer/initiator mixture vessel was rinsed with 11.67 parts of 2-butoxy ethanol which was added to the flask. The batch was held at 98° C. for 30 minutes. After the hold, a dean stark was installed along with the reflux condenser. Batch temperature was raised to 128° C. and about 83.75 parts of isopropanol was stripped out and collected in the dean stark. During the stripping, in a separate vessel, a monomer/initiator/solvent mixture was prepared comprising 112.38 parts of methacrylic add, 112.38 parts of n-butyl methacrylate, 25.01 parts of styrene, 6.13 parts of tert-butyl peracetate (50% aqueous solution), 139.05 parts of n-butanol, and 74.90 parts of 2-butoxy ethanol. After isopropanol was stripped out, dean stark was removed and setup was changed back to straight reflux condenser. The monomer/initiator/solvent mixture was then added to the reactor at a steady state over 2 hours while maintaining temperature at about 128° C. When the monomer/initiator/solvent mixture addition was complete, the monomer/initiator/solvent mixture vessel was rinsed with 7.89 parts of 2-butoxy ethanol which was then added to the reactor. The batch was held at 128° C. for 1 hour. The batch was then coded. When the batch reached 100° C., 59.76 parts of dimethyl ethanolamine was charged over 5 minutes. Then 1001.15 parts of DI water was charged over 20 minutes. This batch yielded a polymer dispersion with 31.26% NV, a particle size of 0.117±0.025 μm, a viscosity of 6,250 centipoise, and a number average molecular weight of 14,199.

Example 3

The following Example is similar to Example 1 but using the same temperature in both polymerization stages.

A three-liter round bottom, four-necked flask equipped with an agitator, a nitrogen net tube, a thermometer, and a reflux condenser was charged with 43.67 parts of n-butanol, 143.29 parts of 2-butoxy ethanol, and 100.0 parts of isopropanol. The flask was heated gradually to reflux at around 98° C. Reflux was maintained during the polymerization. In a separate vessel, a monomer/initiator mixture was prepared containing 251.57 parts of styrene, 201.59 parts of hydroxyethyl methacrylate, 6.90 parts of allyl methacrylate, and 16.67 parts of tert-butyl peroctoate. At 98° C., the monomer/initiator mixture was added to the reactor at a steady state over 2.5 hours. When the monomer/initiator mixture addition was complete, the monomer/initiator mixture vessel was rinsed with 11.67 parts of 2-butoxy ethanol which was added to the flask. The batch was held at 98° C. for 30 minutes. During the hold, in a separate vessel, a monomer/initiator/solvent mixture was prepared comprising 112.38 parts of methacrylic acid, 112.38 parts of n-butyl methacrylate, 25.01 parts of styrene, 6.13 parts of tart-butyl peracetate (50% aqueous solution), 139.05 parts of n-butanol, and 74.90 parts of 2-butoxy ethanol. After the hold without stripping isopropanol to raise temperature, the monomer/initiator/solvent mixture was then added to the reactor at a steady state over 2 hours while maintaining temperature at about 98° C. When the monomer/initiator/solvent mixture addition was complete, the monomer/initiator/solvent mixture vessel was rinsed with 7.89 parts of 2-butoxy ethanol which was then added to the reactor. The batch was held at 98° C. for 1 hour. The batch was then cooled and 59.76 parts of dimethyl ethanolamine was charged over 5 minutes. Then 1001.15 parts of DI water was charged over 20 minutes. This batch yielded a polymer dispersion with 31.43% NV, a particle size of 0.164±0.038 μm, a viscosity of 10,280 centipoise, and a number average molecular weight of 16,719.

Example 4

The following Example is similar to Example 1 but hydroxyethyl methacrylate was used in both stages of the polymerization.

A three-liter round bottom, four-necked flask equipped with an agitator, a nitrogen net tube, a thermometer, and a reflux condenser was charged with 43.67 parts of n-butanol, 143.29 parts of 2-butoxy ethanol, and 100.0 parts of isopropanol. The flask was heated gradually to reflux at around 98° C. Reflux was maintained during the polymerization. In a separate vessel, a monomer/initiator mixture was prepared containing 251.57 parts of styrene, 201.59 parts of hydroxyethyl methacrylate, 6.90 parts of allyl methacrylate, and 16.67 parts of tert-butyl peroctoate. At 98° C., the monomer/initiator mixture was charged into the reactor over 2.5 hours. When the monomer/initiator mixture addition was complete, the monomer/initiator mixture vessel was rinsed with 11.67 parts of 2-butoxy ethanol which was added to the flask. The batch was held at 98° C. for 30 minutes. After the hold, a dean stark was installed along with the reflux condenser. Batch temperature was raised to 128° C. and about 79.17 parts of isopropanol was stripped out and collected in the dean stark. During the stripping, in a separate vessel, a monomer/initiator/solvent mixture was prepared comprising 112.38 parts of methacrylic acid, 91.93 parts of n-butyl methacrylate, 20.46 parts of styrene, 25.00 parts of hydroxyethyl methacrylate, 6.13 parts of tert-butyl peracetate (50% aqueous solution), 139.05 parts of n-butanol, and 74.90 parts of 2-butoxy ethanol. After isopropanol was stripped out, dean stark was removed and setup was changed back to straight reflux condenser. The monomer/initiator/solvent mixture was then added to the reactor at a steady state over 2 hours while maintaining temperature at about 128° C. When the monomer/initiator/solvent mixture addition was complete, the monomer/initiator/solvent mixture vessel was rinsed with 7.89 parts of 2-butoxy ethanol which was then added to the reactor. The batch was held at 128° C. for hour. The batch was then cooled. When the batch reached 100° C., 59.76 parts of dimethyl ethanolamine was charged over 5 minutes. Then 1001.15 parts of DI water was charged over 20 minutes. This batch yielded a polymer dispersion with 31.94% NV, a particle site of 0.117±0.043 μm, a viscosity of 20,240 centipoise, and a number average molecular weight of 16,588.

Comparative Example 5

The following Example is similar to Example 1 but without using allyl methacrylate in the first stage polymerization.

A three-liter round bottom, four-necked flask equipped with an agitator, a nitrogen inlet tube, a thermometer, and a reflux condenser was charged with 66.49 parts of n-butanol and 218.19 parts of 2-butoxy ethanol. The flask was heated gradually to around 110° C., in a separate vessel, a monomer/initiator mixture was prepared containing 313.71 parts of styrene, 251.38 parts of hydroxyethyl methacrylate, and 28.38 parts of tert-butyl peroctoate. At 110° C., the monomer/initiator mixture was added to the reactor at a steady state over 2.5 hours. When the monomer/initiator mixture addition was complete, the monomer/initiator mixture vessel was rinsed with 11.67 parts of 2-butoxy ethanol which was added to the flask. The batch was held at 110° C. for 30 minutes. After the hold, batch temperature was raised to 128° C. During the temperature rising up, in a separate vessel, a monomer/initiator/solvent mixture was prepared comprising 60.83 parts of methacrylic acid, 60.83 parts of n-butyl methacrylate, 13.54 parts of styrene, 6.64 parts of tart-butyl peracetate (50% aqueous solution), 116.23 parts of n-butanol, and 8.18 parts of DI water. At 128° C., the monomer/initiator/solvent mixture was then charged in to the reactor at a steady state over 4 hours while maintaining temperature at 128° C. When the monomer/initiator/solvent mixture addition was complete, the monomer/initiator/solvent mixture vessel was rinsed with 7.89 parts of 2-butoxy ethanol which was then added to the reactor. The batch was held at 128° C. for 1 hour. The batch was then cooled. When the batch reached 100° C., 32.35 parts of dimethyl ethanolamine was charged over 5 minutes. Then 1001.15 parts of DI water was charged over 20 minutes. This batch yielded a polymer suspension with a particle size of 16.39±5.666 μm, a viscosity of 50 centipoise, and a number average molecular weight of 8,264. The dispersion phase separated overnight.

Comparative Example 6

The following Example is similar to Example 1, however polymerization was conducted in one stage rather than in two stages.

A three-liter round bottom, four-necked flask equipped with an agitator, a nitrogen net tube, a thermometer, and a reflux condenser was charged with 43.67 parts of n-butanol, 143.29 parts of 2-butoxy ethanol, and 8.12 parts of Isopropanol. The flask was heated gradually to 128° C. In a separate vessel, a monomer/initiator/solvent mixture was prepared containing 276.58 parts of styrene, 201.59 parts of hydroxyethyl methacrylate, 6.90 parts of allyl methacrylate, 112.38 parts of methacrylic add, 112.38 parts of n-butyl methacrylate, 16.67 parts of tert-butyl peroctoate, 6.13 parts of tert-butyl peracetate (50% aqueous solution), 139.05 parts of n-butanol, and 74.90 parts of 2 butoxy ethanol. At 128° C., the monomer/initiator/solvent mixture was added into the reactor at a steady state over 4.5 hours. When the monomer/initiator/solvent mixture addition was complete, the monomer/initiator/solvent mixture vessel was rinsed with 19.56 parts of 2-butoxy ethanol which was added to the reactor. The batch was held at 128° C. for 1.5 hour. After the hold, the batch was then cooled. When the batch reached 100° C., 59.76 parts of dimethyl ethanolamine was charged over 5 minutes. Then 1001.15 parts of DI water was charged over 20 minutes. This batch yielded a polymer solution with 32.20% NV, a viscosity of 10,360 centipoise, and a number average molecular weight of 11,048.

Stable coating compositions were formulated with the aqueous resinous dispersions of Examples 1-3 as summarized in Tables 1, 3 and 5 below. A coating composition was formulated from Comparative Example 6 as generally described for Examples 1-3. However, the composition phase separated shortly after preparation. The coating compositions were sprayed into 2-piece tin plate cans and baked for 2 minutes 15 seconds at 250° F. (121° C.) and then 2 minutes 30 seconds at 425° F. (218° C.). The cans were hot packed with Chicken & Rice Soup and Acidified Tomato Paste, and were retorted at 250° F. (121° C.) for 60 minutes. Packed cans were then stored in a hot room at 120° F. (49° C.). Corrosion, adhesion, and staining were rated periodically and the test results are summarized in Tables 2, 4 and 6 below. Results were based on triplicate measurements.

In Tables 2, 4 and 6, adhesion refers to body part adhesion whereas bent edge adhesion refers to adhesion on bottom edge area. Cross hatch adhesion test method was used to evaluate both body part and bent edge adhesion. A rating scale of 0-10 was used for adhesion evaluation, where a rating of "10" indicates no adhesion loss and a rating of "0" indicates complete adhesion loss. For staining and corrosion evaluation, a grid system was used to visually determine the number of squares of failure, and then a numerical rating scale of 0-10 was calculated. For staining, a rating of "10" indicates no staining in any of the squares and a rating of "0" indicates a complete change of the color of the film over the whole grid system. For corrosion, a rating of "10" indicates that there is no occurrence of visible corrosion in any of the squares and a rating of "0" indicates 100% coverage of corrosion over the whole grid system. The coating films reported in Table 2 showed good pack performances in Chicken & Rice Soup. Excellent overall corrosion resistance, stain resistance, and adhesion were observed except bottom areas. Slight adhesion failure and some corrosion can be seen on the bottom of the cans, however excellent properties were seen in headspace area. The coating films showed excellent pack performance in Acidified Tomato Paste. Corrosion resistance, adhesion, and stain resistance were outstanding.

TABLE 1

| Composition | Weight (g) | Solids (g) |
| --- | --- | --- |
| Grafted Acrylic Dispersion (Example 1) | 1162.57 | 387.48 |
| Phenolic crosslinker | 624.99 | 387.49 |
| DI Water | 1109.83 | — |
| 2-butoxy ethanol | 69.46 | — |
| Dimethyl Ethanolamine | 9.30 | — |
| Surfynol 104[1] | 32.80 | 32.80 |

[1]Non-ionic surface active agent from Air Products.

TABLE 2

| Pack Performance | | Week 1 | Week 4 | Week 8 | Week 14 |
| --- | --- | --- | --- | --- | --- |
| Chicken & Rice Soup | Corrosion | >7 | >4 | >6 | >3 |
| | Adhesion | 10 | 10 | 10 | >6 |
| | Bent Edge Adhesion | >7 | >6 | >6 | >3 |
| | Staining | 10 | >5 | >6 | >1 |
| Acidified Tomato Paste | Corrosion | >6 | >8 | >7 | >7 |
| | Adhesion | 10 | 10 | 10 | 10 |
| | Bent Edge Adhesion | >7 | 10 | >6 | >9 |
| | Staining | >8 | >4 | 10 | 10 |

Coating compositions formulated with the resin dispersion of Example 2 are reported in Table 3 below. Corrosion, adhesion, and staining results are reported in Table 4 below. The coated films showed good pack performances in Chicken & Rice Soup. The coating had similar performances as in Example 1. Slightly better corrosion on the bottom was seen. In Acidified Tomato Paste, the coating films had slightly worse corrosion on the bottom, but overall the performances were outstanding.

TABLE 3

| Composition | Weight (g) | Solids (g) |
| --- | --- | --- |
| Grafted Acrylic Dispersion (Example 2) | 1204.87 | 376.64 |
| Phenolic (Table 1) | 607.54 | 376.64 |
| DI Water | 1003.73 | — |
| 2-butoxy ethanol | 67.49 | — |
| Dimethyl Ethanolamine | 7.0 | — |
| Sufynol 104 | 31.93 | 31.93 |

TABLE 4

| Pack Performance | | Week 1 | Week 4 | Week 8 | Week 14 |
| --- | --- | --- | --- | --- | --- |
| Chicken & Rice Soup | Corrosion | >5 | >7 | >5 | >3 |
| | Adhesion | 10 | 10 | 10 | >9 |
| | Bent Edge Adhesion | >8 | >7 | >7 | >8 |
| | Staining | 10 | >6 | >5 | >5 |
| Acidified Tomato Paste | Corrosion | >7 | >4 | >4 | >5 |
| | Adhesion | 10 | 10 | 10 | 10 |
| | Bent Edge Adhesion | >9 | >9 | >8 | >8 |
| | Staining | >7 | >5 | >8 | >9 |

Coating compositions formulated with the resin dispersion of Example 3 are reported in Table 5 below. Corrosion, adhesion, and staining results are reported in Table 6 below. In Chicken & Rice Soup, the coating films had the worst corrosion and staining on the bottom. The other areas, e.g. headspace, beads, had equal performance as those in Examples 1 and 2. However, in Acidified Tomato Paste, the coating films had best pack performance. No corrosion, staining, or adhesion failures were seen.

TABLE 5

| Composition | Weight (g) | Solids (g) |
| --- | --- | --- |
| Grafted Acrylic Dispersion (Example 3) | 1168.86 | 389.51 |
| Phenolic (Table 1) | 628.11 | 389.51 |
| DI Water | 1115.49 | — |
| 2-butoxy ethanol | 69.79 | — |
| Dimethyl Ethanolamine | 5.50 | — |
| Surfynol 104 | 32.92 | 32.80 |

TABLE 6

| Pack Performance | | Week 1 | Week 4 | Week8 | Week 14 |
| --- | --- | --- | --- | --- | --- |
| Chicken & Rice Soup | Corrosion | >1 | >3 | >4 | >0 |
| | Adhesion | 10 | >6 | 10 | >8 |
| | Bent Edge Adhesion | >6 | >6 | >7 | >1 |
| | Staining | 10 | 10 | >5 | >3 |
| Acidified Tomato Paste | Corrosion | >8 | >8 | >8 | >6 |
| | Adhesion | 10 | 10 | 10 | 10 |
| | Bent Edge Adhesion | >8 | 10 | >7 | 10 |
| | Staining | 10 | >9 | >9 | >7 |

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. An article comprising a body portion or an end portion of a food or beverage can and a coating composition disposed thereon wherein the coating composition comprises the reaction product of:
    (a) a hydrophobic vinyl addition polymer containing pendant or terminal ethylenically unsaturated groups,
    (b) a mixture of vinyl monomers including a vinyl monomer containing carboxylic acid groups;
    the reaction product containing active hydrogen groups, having an acid value of 40 to 200 and being at least partially neutralized with a base and dispersed in aqueous medium; the aqueous dispersion being substantially free of bisphenol A and derivatives thereof.

2. The article of claim 1 in which the reaction product of (a) and (b) is conducted in non-aqueous medium.

3. The article of claim 1 in which the hydrophobic vinyl addition polymer is not self-dispersible with amine in water.

4. The article of claim 1 in which (a) contains active hydrogen groups.

5. The article of claim 1 in which (a) is prepared from a mixture of vinyl monomers selected from the class consisting of (i) aromatic vinyl monomers, (ii) hydroxyalkyl (meth) acrylates containing from 2 to 4 carbon atoms in the hydroxyalkyl group, and (iii) monomers containing both (meth)acrylate unsaturation and (meth)allyl unsaturation.

6. The article of claim 5 in which (ii) is present in the mixture of vinyl monomers in an amount of 5 to 40 percent by weight based on total weight of vinyl monomers.

7. The article of claim 5 in which (iii) is selected from the group consisting of (meth)allyl (meth)acrylate and condensates of hydroxyalkyl (meth)acrylate and alpha, beta-ethylenically unsaturated dicarboxylic acids.

8. The article of claim 1 in which (a) has a number average molecular weight of 3,000 to 50,000.

9. The article of claim 1 in which (a) has a pendant or terminal ethylenically unsaturated group equivalent weight of 5,000 to 20,000.

10. The article of claim 1 in which (b) contains monomers selected from the group consisting of aromatic vinyl monomers and alkyl (meth)acrylates containing from 1 to 12 carbon atoms in the alkyl group.

11. The article of claim 1 in which the reaction product has a number average molecular weight of 5,000 to 70,000.

12. The article of claim 1 in which the active hydrogens are hydroxyl and the reaction product has a hydroxyl value of 80 to 200 based on resin solids of the reaction product.

13. The article of claim 1, which additionally contains a crosslinking agent that is reactive with the active hydrogen groups.

14. The article of claim 13 in which the crosslinking agent is selected from the group consisting of aminoplast and phenolplast.

15. The article of claim 14 in which the crosslinking agent is present in the aqueous dispersion in amounts of 5 to 70 percent by eight based on weight of resin solids of the aqueous dispersion.

16. The article of claim 1 which has a resin solids content of 10 to 50 percent by weight based on total weight of the aqueous dispersion.

17. The article of claim 1 wherein the coating composition, when present on a beverage can end at a dry film thickness of 4 milligrams per square inch, passes less than 2 milliamps of current after being exposed for 10 seconds to a room temperature electrolyte solution containing 1% by weight NaCl dissolved in water.

18. A method comprising:
(a) providing a coating composition comprising an aqueous dispersion that comprises the reaction product of:
(i) a hydrophobic vinyl addition polymer containing pendant or terminal ethylenically unsaturated groups,
(ii) a mixture of vinyl monomers including a vinyl monomer containing carboxylic acid groups;
the reaction product containing active hydrogen groups, having an acid value of 40 to 200 and being at least partially neutralized with a base and dispersed in aqueous medium; the aqueous dispersion being substantially free of bisphenol A and derivatives thereof;
(b) applying the coating composition to a metal substrate prior to or after forming the metal substrate into a food or beverage can or portion thereof.

19. The method of claim 18 in which the coating composition is applied to a can end.

20. The method of claim 18 in which (a) of the resinous dispersion has a pendant or terminal ethylenically unsaturated group equivalent weight of 5,000 to 20,000.

21. The method of claim 18 in which the reaction product of the aqueous dispersion has a number average molecular weight of 5,000 to 70,000.

22. The method of claim 18 in which the coating composition contains a crosslinking agent that is reactive with the active hydrogen groups.

23. The method of claim 18 in which the crosslinking agent is selected from the group consisting of aminoplast and phenolplast.

* * * * *